(12) United States Patent
Huber et al.

(10) Patent No.: US 6,771,843 B1
(45) Date of Patent: Aug. 3, 2004

(54) DATA TIMELINE MANAGEMENT USING SNAPSHOT VOLUMES

(75) Inventors: Robin Huber, Wichita, KS (US); Donald R. Humlicek, Wichita, KS (US)

(73) Assignee: LSI Logic Corporation, Milpitas, CA (US)

(*) Notice: Subject to any disclaimer, the term of this patent is extended or adjusted under 35 U.S.C. 154(b) by 635 days.

(21) Appl. No.: 09/853,562

(22) Filed: May 11, 2001

(51) Int. Cl.[7] .................. G06K 9/54; G06F 12/00; H02H 3/05
(52) U.S. Cl. .................. 382/305; 711/114; 714/6
(58) Field of Search .................. 711/162, 114, 711/141, 154; 707/8, 204, 202, 203; 714/6, 7; 382/305, 232; 345/850, 660; 348/584, 588

(56) References Cited

U.S. PATENT DOCUMENTS

| | | | |
|---|---|---|---|
| 5,317,731 A | 5/1994 | Dias et al. | 707/8 |
| 5,487,160 A | 1/1996 | Bemis | 711/114 |
| 5,574,851 A | 11/1996 | Rathunde | 714/7 |
| 5,680,580 A | 10/1997 | Beardsley | 714/6 |
| 6,259,828 B1 * | 7/2001 | Crinon et al. | 382/305 |
| 6,457,098 B1 | 9/2002 | DeKoning et al. | 711/114 |

OTHER PUBLICATIONS

Prakash et al., "low–Cost Checkpointing and Failure Recovery in Mobile Computing system", IEEE Transactions on Parallel an Distributed Systems, vol. 7, No. 10, Oct. 1996, pp., 1035–1048.*

* cited by examiner

*Primary Examiner*—Anh Hong Do
(74) *Attorney, Agent, or Firm*—Christopher P. Maiorana, P.C.

(57) ABSTRACT

In a computerized data storage system, snapshot volumes are used to preserve the state of the base volume at various points in time, and later-formed snapshot volumes are retained after rolling back an earlier-formed snapshot volume into the base volume. During the rollback, data writes to the base volume are copied to the later-formed snapshot volumes when necessary to continue to preserve the states of the base volume represented by the later-formed snapshot volumes.

9 Claims, 7 Drawing Sheets

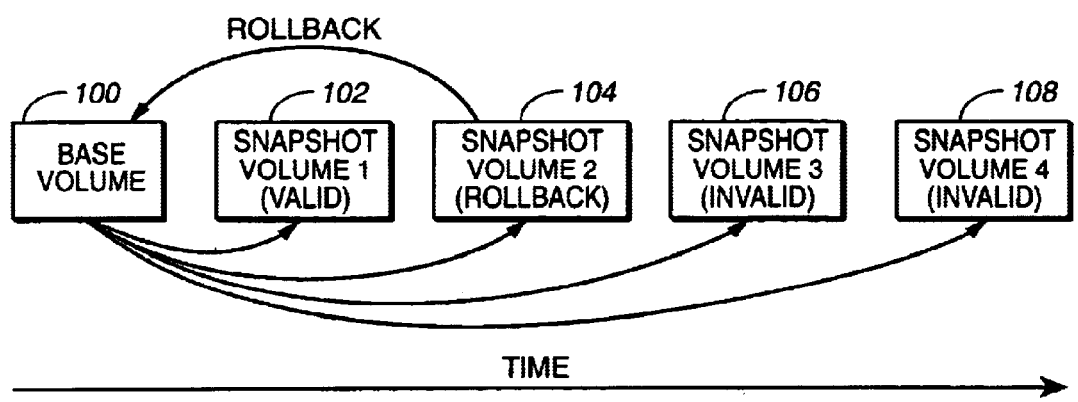
FIG._1 (PRIOR ART)
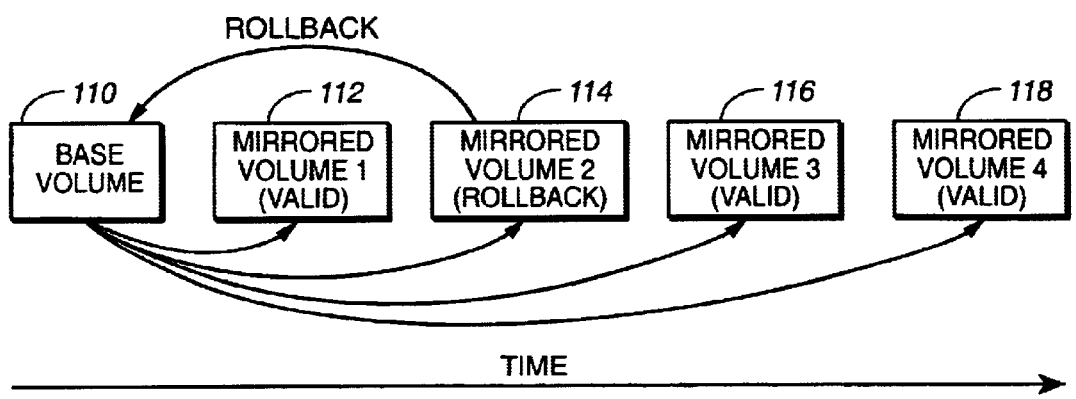
FIG._2 (PRIOR ART)
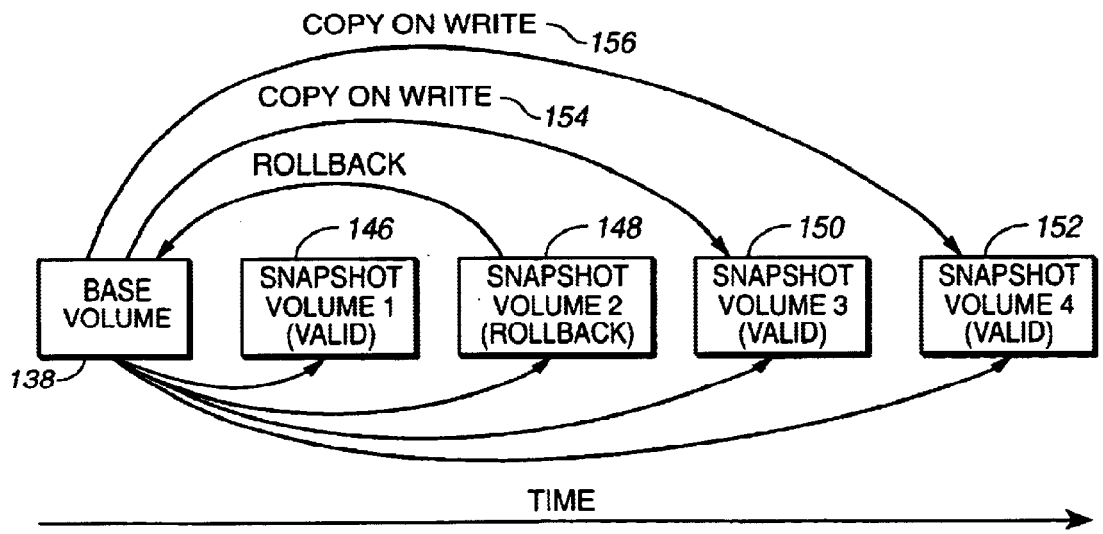
FIG._4

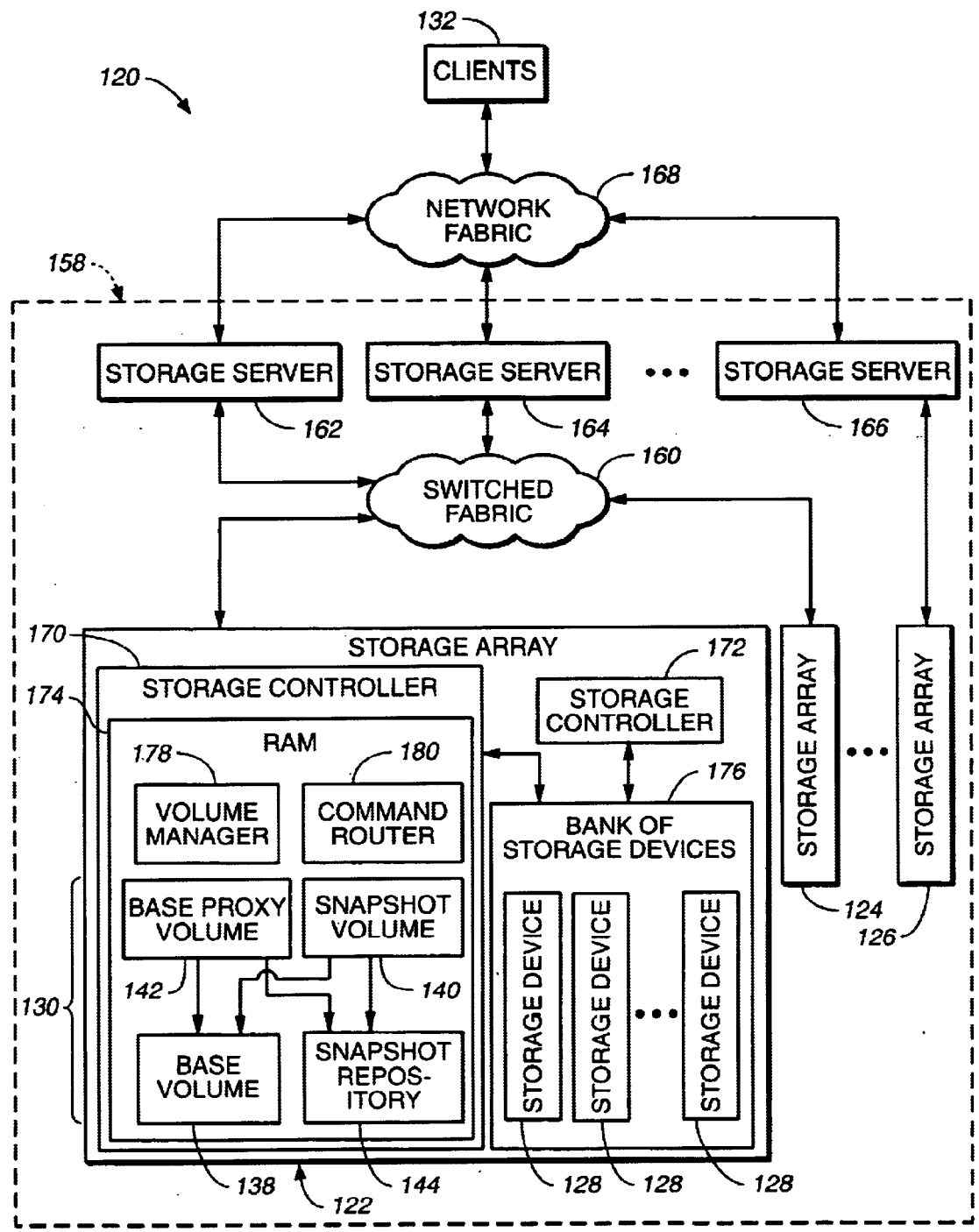
FIG._3

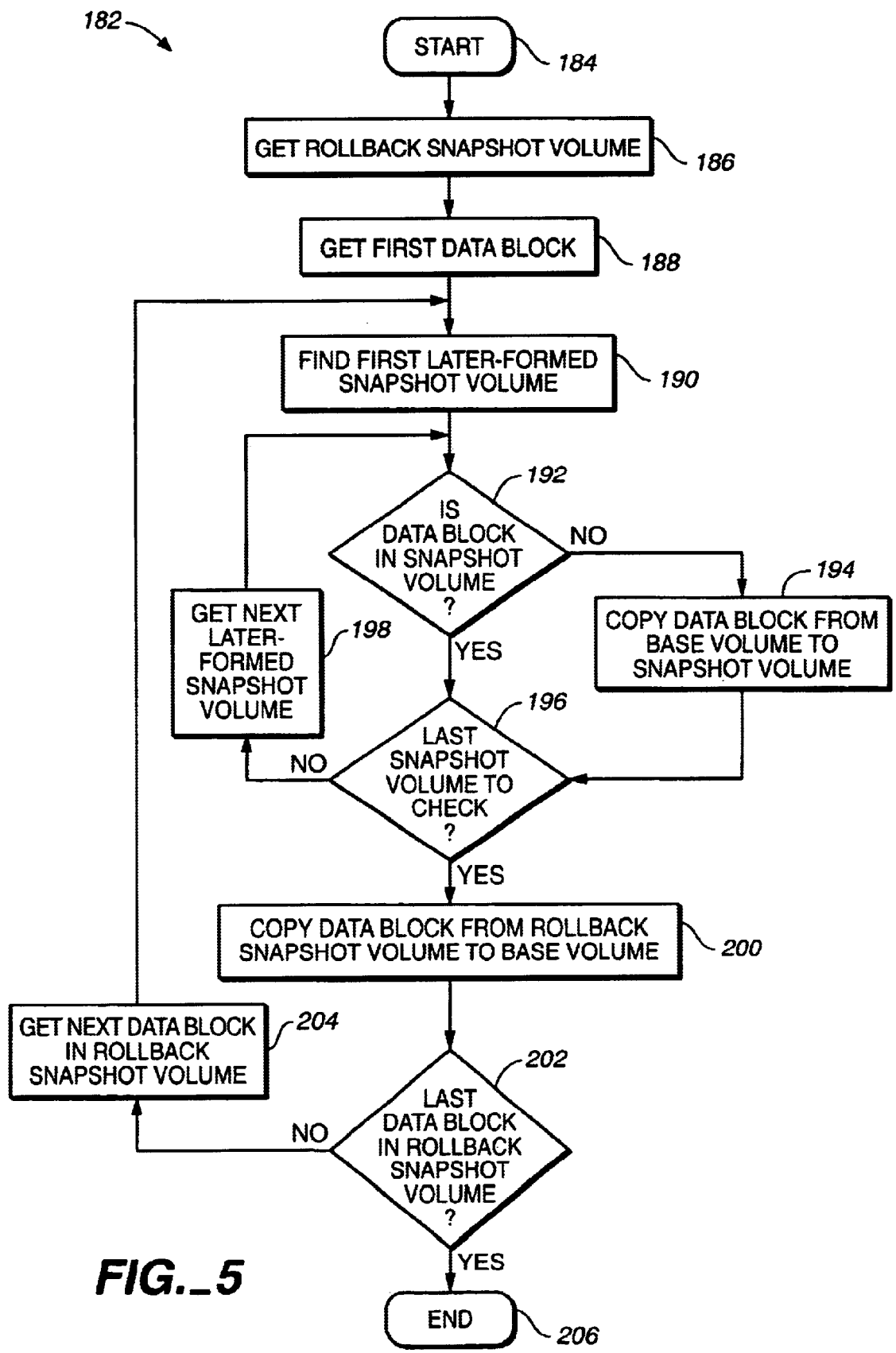
FIG._5

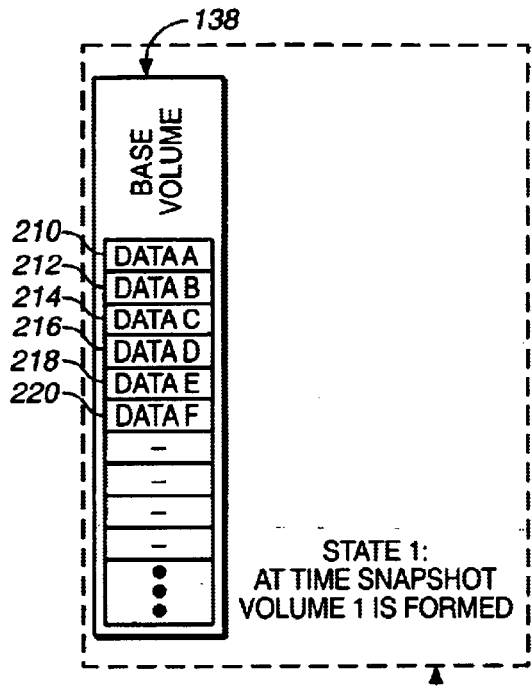
FIG._6
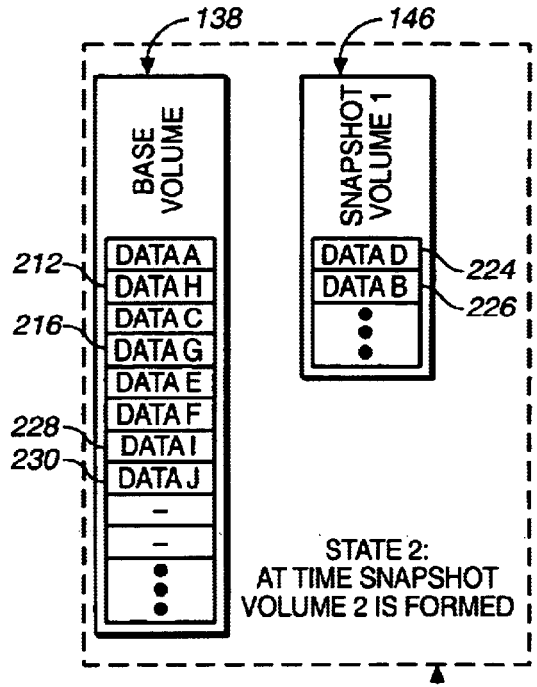
FIG._7
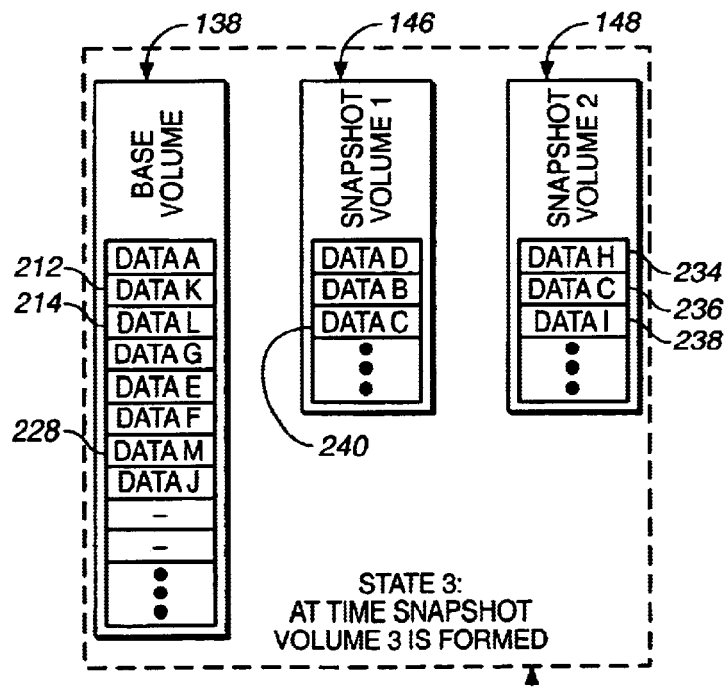
FIG._8

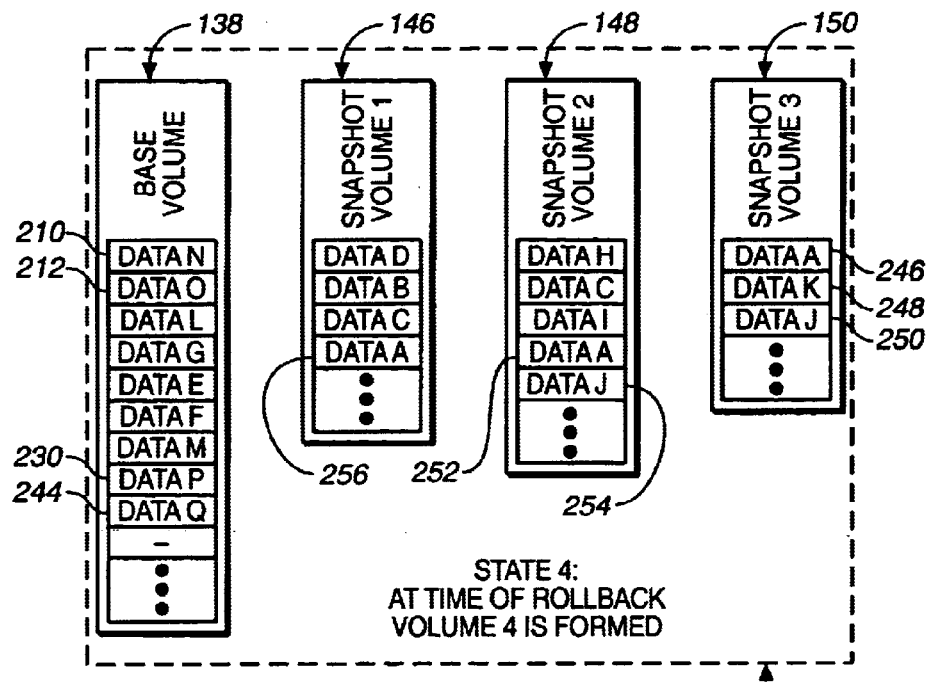
FIG._9
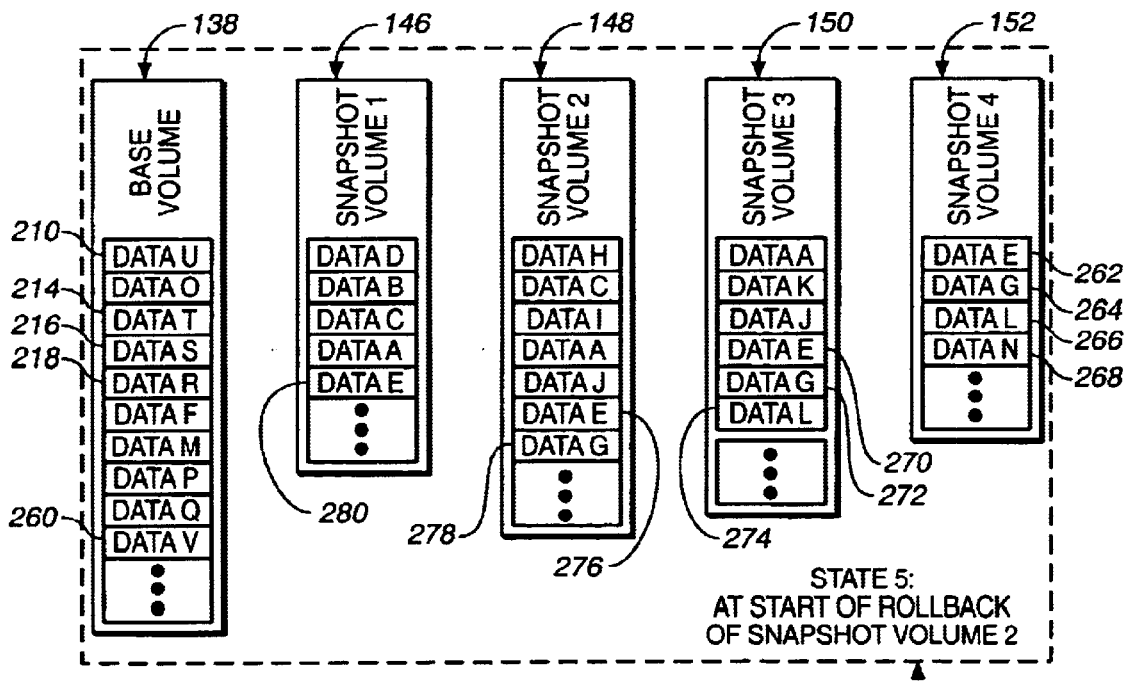
FIG._10

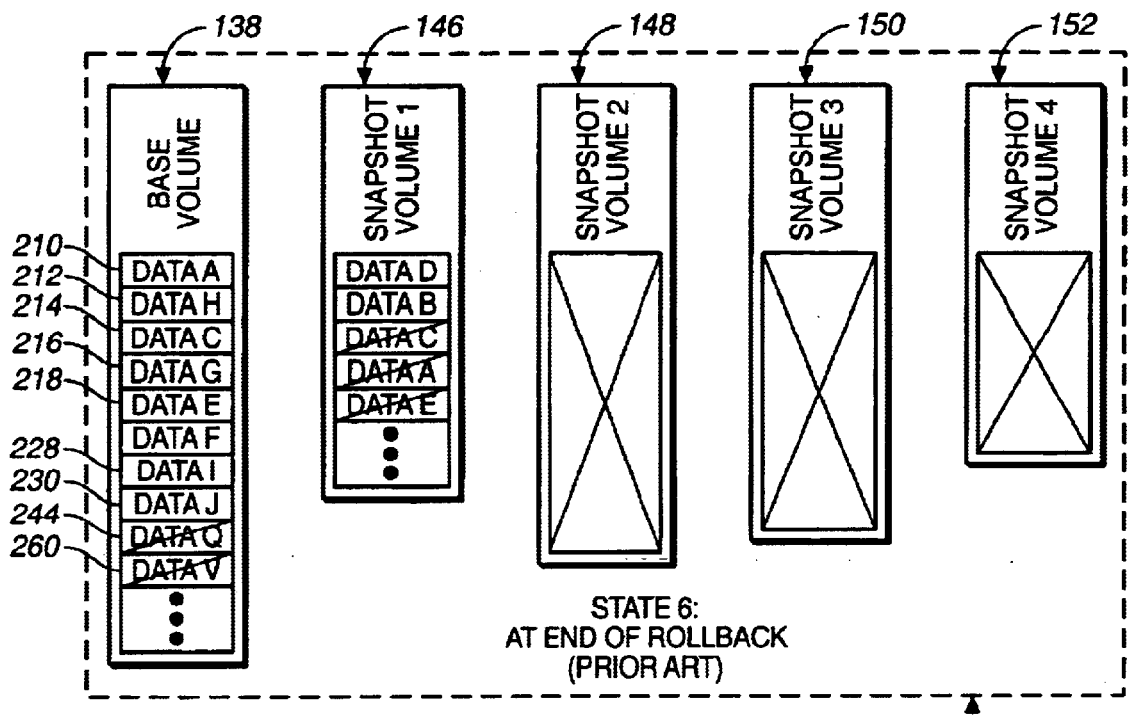
FIG._11 (PRIOR ART)
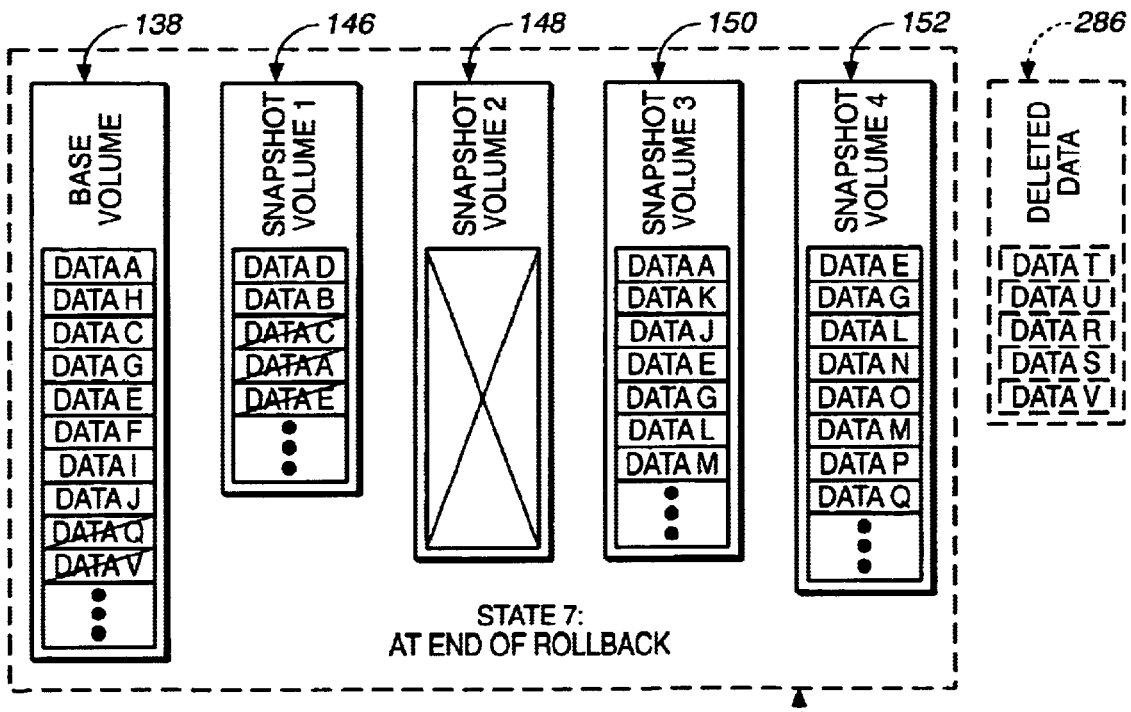
FIG._12

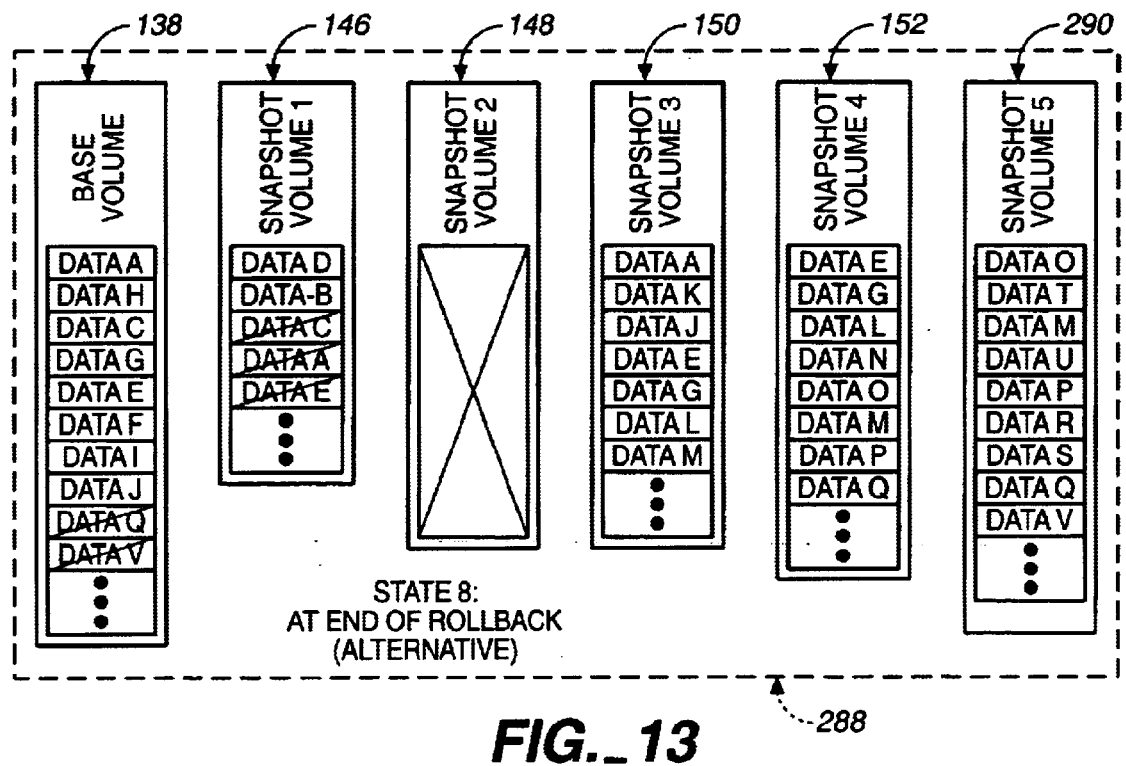
FIG._13

DATA TIMELINE MANAGEMENT USING SNAPSHOT VOLUMES

CROSS-REFERENCE TO RELATED APPLICATIONS

This invention is related to an invention for Managing a Snapshot Volume or One or More Checkpoint Volumes with Multiple Point-In-Time Images in a Single Repository, described in U.S. patent application Ser. No. 09/735,175, filed Dec. 11, 2000, and to an invention for Method that Allows I/O Requests to Run Concurrently with a Rollback from a Snapshot in a Drive Array, described in U.S. patent application Ser. No. 09/694,534, filed Oct. 23, 2000, assigned to the same assignee as the present invention. The disclosure of this patent application is incorporated herein by this reference.

FIELD OF THE INVENTION

This invention relates to apparatus and methods for data storage in a computerized network or system. More particularly, the present invention relates to management of data at points in time using snapshot volumes of an original base volume, such that later-formed snapshot volumes are retained, rather than deleted, upon returning the base volume to the state of an earlier-formed snapshot volume.

BACKGROUND OF THE INVENTION

In a computerized data storage system, it is common to store data in a logical volume that changes over time as users access the data to add, delete and modify the data. For large databases or enterprise-critical data storage applications, it is often advantageous to preserve the state of the data at occasional or periodic time intervals using snapshot techniques or mirroring techniques. Such a preserved state is commonly used to return the data to a known stable state if the data ever becomes corrupted or invalid. In such a situation, the users experience only a short interruption in availability of the data before the data is once again accessible, albeit in an earlier state.

In snapshot techniques, as illustrated by FIG. 1, the data is contained in a primary, or "base," logical volume 100 and various "snapshot" logical volumes 102, 104, 106 and 108 are formed therefrom at various times to preserve the state of the base volume 100 at those times. Each snapshot volume 102–108 contains data copied from the base volume 100 that was present in the base volume 100 at the time that the snapshot volume 102–108 was formed. When the base volume 100 is to be returned to the state of one of the snapshot volumes 102–108, the data in the snapshot volume 102–108 is written back into the base volume 100 in a "rollback" procedure.

In snapshot techniques, it is typically assumed that if the data in the base volume 100 becomes invalid, then it is only the data that was added to or changed in the base volume 100 since the formation of the snapshot volume 102–108 that is incorrect. Therefore, the snapshot volume 102–108 contains only the original data that was present in the base volume 100 at the time the snapshot volume 102–108 was formed, but which has since been deleted from the base volume 100 or changed or replaced by new data within the base volume 100. Thus, a rollback procedure returns the original data to the base volume 100 and removes any new data. Data that has not been changed in the base volume 100 since the formation of the snapshot volume 102–108, on the other hand, is contained only in the base volume 100 and remains unaffected by a rollback.

After the snapshot volume (e.g. 104) is rolled back into the base volume 100, the snapshot volume 104 is no longer needed, so it may be deleted, unless it is desired to continue to preserve the state of the base volume 100 at the time the snapshot volume 104 was formed. An earlier-formed snapshot volume (e.g. 102), since it preserves an earlier state of the base volume 100, is typically maintained after the rollback of the snapshot volume 104. Later-formed snapshot volumes (e.g. 106 and 108), however, are invalidated and deleted, since the later states of the base volume 100 (at which the later-formed snapshot volumes 106 and 108 were formed) become superfluous after rolling back the base volume 100 to an earlier state. Thus, the later states are lost.

Mirroring techniques enable the preservation of states of a base volume 110, as shown in FIG. 2, at various points in time by copying the entire base volume 110 into mirrored volumes 112, 114, 116 and 118 at those points in time. Since each mirrored volume 112–118 contains a complete copy of the base volume 110 at the points in time when the mirrored volumes 112–118 were formed, each mirrored volume 112–118 is effectively an independent logical volume. Therefore, upon rolling back one of the mirrored volumes (e.g. 114) to the base volume 110, it is possible to retain all of the other mirrored volumes 112, 116 and 118, including the later-formed mirrored volumes 116 and 118, independently of the base volume 110. However, the mirroring techniques, unlike the snapshot techniques, require considerable storage space to contain the mirrored volumes 112–118 and consume considerable processing time to form the mirrored volumes 112–118.

It is with respect to these and other background considerations that the present invention has evolved.

SUMMARY OF THE INVENTION

The present invention utilizes snapshot techniques to preserve the state of a base volume at various points in time, but enables retention of later-formed snapshot volumes upon rolling back one of the snapshot volumes into the base volume. Thus, the present invention has the above described advantages of the snapshot and mirroring techniques for preserving states of the base volume without the disadvantages, such as losing later-formed snapshot volumes and consuming excessive processing time or storage space.

Upon rolling back one of the snapshot volumes to the base volume, the writes of the data from the rollback snapshot volume to the base volume are treated as ordinary writes to the base volume. Thus, data is copied from the base volume to any of the other snapshot volumes when necessary to preserve the states of the base volume at the points in time when the other snapshot volumes were formed. In this manner, the later-formed, as well as the earlier-formed, snapshot volumes can be retained after rolling back the base volume. It is possible, then, to "roll back" the base volume "forward" to the state of one of the later-formed snapshot volumes if desired.

A more complete appreciation of the present invention and its scope, and the manner in which it achieves the above noted improvements, can be obtained by reference to the following detailed description of presently preferred embodiments of the invention taken in connection with the accompanying drawings, which are briefly summarized below, and the appended claims.

BRIEF DESCRIPTION OF THE DRAWINGS

FIG. 1 is a block diagram of a prior art data timeline management system.

FIG. 2 is a block diagram of another prior art data timeline management system.

FIG. 3 is a block diagram of a storage system incorporating the present invention.

FIG. 4 is a block diagram of a data timeline management system used in the storage system shown in FIG. 3.

FIG. 5 is a flowchart for a procedure to roll back the storage system shown in FIG. 2.

FIGS. 6–10 are block diagrams of states of an exemplary base volume and various exemplary snapshot volumes in the data timeline management system shown in FIG. 4.

FIG. 11 is a block diagram of a state of the exemplary base volume and snapshot volumes shown in FIGS. 6–10 after performing a prior art rollback procedure.

FIGS. 12 and 13 are block diagrams of alternative states of the exemplary base volume and snapshot volumes shown in FIGS. 6–10 after performing the rollback procedure shown in FIG. 5.

DETAILED DESCRIPTION

A storage system 120, as shown in FIG. 3, generally includes several conventional storage arrays 122, 124 and 126 of conventional storage devices 128. The storage arrays 122–126 generally contain several logical volumes 130 of data typically accessed via conventional I/O (input/output) access requests by conventional clients 132. The logical volumes 130 preferably include one or more base volumes 138 which contain the data primarily accessed via the I/O access requests. When the state of the data in the base volume 138 needs to be preserved at a particular point in time, a snapshot volume 140, a base proxy volume 142 and a snapshot repository 144 are preferably formed from the base volume 138 as described in the aforementioned patent application. Any number of snapshot volumes 140, and the corresponding base proxy volumes 142 and snapshot repositories 144, may be created to preserve the state of the base volume 138 at any number of points in time.

To preserve the state of the base volume 138 at the point in time when the snapshot volume 140 is formed, data that is present in the base volume 138 at the point in time is copied to the snapshot volume 140 when it is later changed in or deleted from the base volume 138 by the I/O access requests. This copying is similar to a conventional copy-on-write procedure. When the data in the base volume 138 becomes corrupted or invalid, the I/O access requests are halted and the snapshot volume 140 is used to restore the data copied from the base volume 138 back to the base volume 138, thereby "rolling back" the base volume 138 to the state it held at the point in time when the snapshot volume 140 was formed. The earlier state is a known valid state, so the I/O access requests may resume with valid data.

When multiple snapshot volumes 140 (e.g. 146, 148, 150 and 152, see FIG. 4) are formed from the base volume 138 and one of the earlier-formed snapshot volumes (e.g. 148) is used to roll back the base volume 138, copy-on-write procedures 154 and 156 are performed to the later-formed snapshot volumes 150 and 152 as shown in FIG. 4. During the rollback, some of the data in the base volume 138 that was present in the base volume 138 at the points in time when the snapshot volumes 150 and 152 were formed may be deleted or replaced by the data copied from the rollback snapshot volume 148. To continue to preserve the states of the base volume 138 at the later points in time, however, the copy-on-write procedures 154 and 156 copy the data (that was present in the base volume 138 at the later points in time and is about to be deleted or changed) from the base volume 138 to the snapshot volumes 150 and 152. In this manner, not only is any earlier-formed snapshot volume 146 retained after the rollback, but the later-formed snapshot volumes 150 and 152 are also retained and valid. Therefore, even after being rolled back, the base volume 138 can be "rolled forward" to the state at which one of the later-formed snapshot volumes 150 and 152 was formed by performing a conventional rollback procedure with the later-formed snapshot volume 150 or 152.

After the rollback procedure completes, the rollback snapshot volume 148 and the base proxy volume 142 (FIG. 3) and the snapshot repository 144 (FIG. 3) corresponding to the rollback snapshot volume 148 are deleted. Alternatively, the rollback snapshot volume 148 and its corresponding base proxy volume 142 and snapshot repository 144 may be retained in order to continue to preserve the state of the base volume 138 at the point in time when the rollback snapshot volume 148 was formed, which is now the same as the state of the base volume 138 immediately after the point in time when the rollback was performed.

Referring back to FIG. 3, the storage arrays 122–126 typically form a storage area network (SAN) 158 with a conventional switched fabric 160 (e.g. Fibre Channel) and one or more conventional storage servers 162, 164 and 166. The clients 132 typically access the storage arrays 122–126 through the storage servers 162–166 and possibly through the switched fabric 160. One storage array 126 and one storage server 166, however, are shown connected directly to each other, instead of through the switched fabric 160, to illustrate an alternative configuration. A conventional network fabric 168 (such as an Ethernet network) commonly connects the clients 132 to the storage servers 162–166.

The storage arrays 122–126 typically include one or more conventional storage controllers 170 or 172, which control the functions of the storage arrays 122–126, including the accessing of the logical volumes 130, the creation and deletion of the different types of the logical volumes 130 and the rolling back of the data stored in the snapshot volume 140, among other functions. The storage controllers 170 and 172 typically include a conventional main memory, or RAM, 174 in which the logical volumes 130 and other software operating in the storage arrays 122–126 reside. Backup copies of the logical volumes 130 also reside on the storage devices 128 arranged in a bank 176 of storage devices.

A volume manager 178 (a software program) resides in the RAM 174 and operates in the storage controllers 170 and 172 to create, delete and otherwise manage the logical volumes 130. A command router 180 (another software program) also resides in the RAM 174 and operates in the storage controllers 170 and 172 to route and manage the I/O access requests, including the normal I/O access requests directed to the base volume 138 and the rollback procedures directed to the snapshot volume 140.

A procedure 182, preferably under initial control of the command router 180 (FIG. 3), for rolling back a snapshot volume 148 (FIG. 4) into a base volume 138 (FIGS. 3 and 4) when there are other later-formed snapshot volumes 150 and 152 (FIG. 4) formed from the same base volume 138 is shown in FIG. 5. For this exemplary procedure 182, blocks of data have previously been copied from the base volume 138 to the snapshot volumes 148, 150 and 152, though not every data block was copied to every snapshot volume 148–152. The data blocks in the snapshot volumes 148–152 are preferably labeled with logical block addresses defining the data blocks as they were originally located in the base volume 138. The rollback procedure 182 starts at step 184. The rollback snapshot volume 148 is acquired at step 186. The first data block, or the logical block address for the first data block, in the rollback snapshot volume 148 is acquired at step 188. The first later-formed snapshot volume 150 is located at step 190.

It is determined at step 192 whether the current data block is in the current later-formed snapshot volume 150 (FIG. 4), preferably by comparing the logical block address of the current data block with the logical block addresses of the data blocks already contained in the current later-formed snapshot volume 150. If not the current data block is not within the current later-formed snapshot volume 150, then a copy-on-write procedure must be performed before the current data block is written to the base volume 138 (FIGS. 3 and 4), overwriting whatever data is in the data block at the same logical block address within the base volume 138. Therefore, the data block within the base volume 138 at the same logical block address as the current data block is copied (step 194) to the current later-formed snapshot volume 150.

After copying the data block to the current later-formed snapshot volume 150 (FIG. 4), or if the current data block is already in the current later-formed snapshot volume 150, as determined at step 192, it is determined (step 196) whether the current later-formed snapshot volume 150 is the last of the later-formed snapshot volumes 150 and 152 (FIG. 4) to be checked for the presence of the current data block. If not, then the next later-formed snapshot volume 152 is acquired at step 198 and the procedure 182 branches back to step 192 to check for the presence of the current data block in the next later-formed snapshot volume 152 and to perform a copy-on-write (step 194) for the next later-formed snapshot volume 152 if necessary. After the data block in the base volume 138 (FIGS. 3 and 4) that is about to be replaced by the current data block from the rollback snapshot volume 148 (FIG. 4) has been copied to all of the later-formed snapshot volumes 150 and 152 that require it, i.e. the determination at step 196 is positive, the current data block is copied (step 200) from the rollback snapshot volume 148 to the base volume 138.

It is determined at step 202 whether the current data block is the last data block in the rollback snapshot volume 148 (FIG. 4). If not, then the next data block in the rollback snapshot volume 148 is acquired at step 204. The procedure 182 branches back to step 190 to check for the presence of the next data block in the later-formed snapshot volumes 150 and 152 (FIG. 4), perform copy-on-write procedures where necessary and copy the next data block to the base volume 138 (FIGS. 3 and 4). Once the last data block in the rollback snapshot volume 148 has been copied to the base volume 138, the rollback procedure 182 ends at step 206.

FIGS. 6–9 show exemplary states of the base volume 138 (FIGS. 3 and 4) and the snapshot volumes 146–152 (FIG. 4) after data has been written to the base volume 138 and copied to the snapshot volumes 146–152 at points in time when the snapshot volumes 146–152 are formed. Also, FIG. 10 shows an exemplary state of the base volume and the snapshot volumes 146–152 at the point in time when the rollback procedure 182 (FIG. 5) is to be performed. Using the example data shown in FIGS. 6–10, an exemplary prior art result after performing a prior art rollback procedure is shown in FIG. 11 and compared to alternative exemplary results shown in FIGS. 12 and 13 after performing the rollback procedure 182.

At the first state 208 shown in FIG. 6, at the point in time that the first snapshot volume 146 (FIG. 4) is formed, the base volume 138 contains data A–F in data blocks 210, 212, 214, 216, 218 and 220. At the second state 222 shown in FIG. 7, at the point in time that the second snapshot volume 148 (FIG. 4) is formed, new data G and H have replaced data D and B, respectively, in data blocks 216 and 212, respectively, in the base volume 138. Data D and B have been copied, in the order in which they were replaced, to data blocks 224 and 226, respectively, in the first snapshot volume 146. Additionally, new data I and J have been added to data blocks 228 and 230 in the base volume 138.

At the third state 232 shown in FIG. 8, at the point in time that the third snapshot volume 150 (FIG. 4) is formed, new data K, L and M have replaced data H, C and I, respectively, in data blocks 212, 214 and 228, respectively, in the base volume 138. Replaced data H, C and I were all present in the base volume 138 at the state 222 (FIG. 7) at the time that the second snapshot volume 148 was formed, so the replaced data H, C and I are copied, in the order replaced, to data blocks 234, 236 and 238 in the second snapshot volume 148. Additionally, of the replaced data H, C and I, only the data C was present in the base volume 138 at the state 208 (FIG. 6) at the time that the first snapshot volume 146 was formed, so only the replaced data C is copied to data block 240 in the first snapshot volume 146.

At the fourth state 242 shown in FIG. 9, at the point in time that the fourth snapshot volume 152 (FIG. 4) is formed, new data N, O and P have replaced data A, K and J, respectively, in data blocks 210, 212 and 230, respectively, in the base volume 138. Additionally, new data Q has been added to the base volume 138 at data block 244. Replaced data A, K and J were all present in the base volume 138 at the state 232 (FIG. 8) at the time that the third snapshot volume 150 was formed, so the replaced data A, K and J are copied, in the order replaced, to data blocks 246, 248 and 250, respectively, in the third snapshot volume 150. Additionally, of the replaced data A, K and J, the data A and J were present in the base volume 138 at the state 222 (FIG. 7) at the time that the second snapshot volume 148 was formed, so the replaced data A and J are copied to data blocks 252 and 254 in the second snapshot volume 148. Additionally, of the replaced data A, K and J, only the data A was present in the base volume 138 at the state 208 (FIG. 6) at the time that the first snapshot volume 146 was formed, so only the replaced data A is copied to data block 256 in the first snapshot volume 146.

At the fifth state 258 shown in FIG. 10, at the point in time that the rollback procedure 182 (FIG. 5) to roll back the second snapshot volume 148 into the base volume 138 is begun, new data R, S, T and U have replaced data E, G, L and N, respectively, in data blocks 218, 216, 214 and 210, respectively, in the base volume 138. Additionally, new data V has been added to the base volume 138 at data block 260. Replaced data E, G, L and N were all present in the base volume 138 at the state 242 (FIG. 9) at the time that the fourth snapshot volume 152 was formed, so the replaced data E, G, L and N are copied, in the order replaced, to data blocks 262, 264, 266 and 268, respectively, in the fourth snapshot volume 152. Additionally, of the replaced data E, G, L and N, the data E, G and L were present in the base volume 138 at the state 232 (FIG. 8) at the time that the third snapshot volume 150 was formed, so the replaced data E, G and L are copied to data blocks 270, 272 and 274 in the third snapshot volume 150. Additionally, of the replaced data E, G, L and N, the data E and G were present in the base volume 138 at the state 222 (FIG. 7) at the time that the second snapshot volume 148 was formed, so the replaced data E and G are copied to data blocks 276 and 278 in the second snapshot volume 148. Additionally, of the replaced data E, G, L and N, only the data E was present in the base volume 138 at the state 208 (FIG. 6) at the time that the first snapshot volume 146 was formed, so only the replaced data E is copied to data block 280 in the first snapshot volume 146.

At the sixth state 282, as shown in FIG. 11, after performing the prior art rollback example shown in FIG. 1, the second snapshot volume 148 has been rolled back into the base volume 138. Thus, the data H, C, I, A, J, E and G in the second snapshot volume 148 at state 258 (FIG. 10) at the start of the prior art rollback procedure have been returned to data blocks 212, 214, 228, 210, 230, 218 and 216, respectively, replacing data O, T, M, U, P, R and S, respectively. The data Q and V in data blocks 244 and 260, respectively, in the base volume 138 are deleted. The second snapshot volume 148 is now empty and may be deleted. Alternatively, the second snapshot volume 148 may be retained to continue to preserve the state 282, which is similar to the state 222 (FIG. 7). In this case, the data in the second snapshot volume 148 may not be deleted, but may be retained, so it does not have to be copied again if it is later replaced in the base volume 138 again. In the first snapshot volume 146, the data C, A and E is now redundant, since this data has been rolled back into the base volume 138. Therefore, the data C, A and E may be deleted from the first snapshot volume 146 or retained, so it does not have to be copied again if it is later replaced in the base volume 138 again. The later-formed third and fourth snapshot volumes 150 and 152 are now invalid and may be deleted. However, doing so will result in the loss of all data that was added to the base volume 138 after the second state 222, e.g. data K–V.

At the seventh exemplary state 284, as shown in FIG. 12, after performing the rollback procedure 182 (FIG. 5) starting at the fifth state 258 (FIG. 10), the second snapshot volume 148 has been rolled back into the base volume 138, but the later-formed snapshot volumes 150 and 152 do not have to be invalidated or deleted. Therefore, the only data 286 lost due to the rollback is the last data to have been added to the base volume 138, e.g. data R, S, T, U and V, as of the fifth state 258. Other data in the base volume 138 that is replaced by the rolled back data from the second snapshot volume 148 includes data M, O and P. Of this data, all of it was present in the base volume 138 at the fourth state 242 (FIG. 9), so all of it is copied to the fourth snapshot volume 152, but only data M was present in the base volume 138 at the third state 232 (FIG. 8), so only data M is copied to the third snapshot volume 150. Additionally, data Q was present in the base volume 138 at the fourth state 242, but was deleted from, without replacing in, the base volume 138 by the rollback procedure 182, so data Q is copied to the fourth snapshot volume 152. After the rollback, the base volume 138, the first snapshot volume 146 and the second snapshot volume 148 are in a state similar to that in the prior art post-rollback state 282 (FIG. 11).

At the eighth exemplary state 288 (an alternative to the seventh state 284, FIG. 12), as shown in FIG. 13, after performing the rollback procedure 182 (FIG. 5) starting at the fifth state 258 (FIG. 10), the base volume 138 and the first, second, third and fourth snapshot volumes 146–152 have the same state as that in the seventh state 284, but a fifth snapshot volume 290 has been formed to preserve the base volume 138 at the fifth state 258. In this manner, none of the data present in the base volume 138 at the fifth state 258 is lost. Rather, all of the replaced and deleted data M and O–V is copied from the base volume 138 to the fifth snapshot volume 290 in the order that it is replaced or deleted in the base volume 138.

The present invention has the advantage of retaining later-formed snapshot volumes upon rolling back an earlier-formed snapshot volume to the base volume. Thus, any data loss is minimized, if not eliminated by use of another snapshot volume formed at the start of the rollback. Therefore, even after the base volume has been rolled back to an earlier state, it can still be "rolled forward" to any later state. In this manner, all states can be preserved as long as desired.

Presently preferred embodiments of the invention and its improvements have been described with a degree of particularity. This description has been made by way of preferred example. It should be understood that the scope of the present invention is defined by the following claims, and should not be unnecessarily limited by the detailed description of the preferred embodiments set forth above.

The invention claimed is:

1. A method of managing point-in-time data images of a base volume containing data in a data storage system, the base volume being used for data storage read and write accesses, states of the base volume at various points in time being preserved by a snapshot technique that forms snapshot volumes from the base volume at the points in time, comprising the steps of:

forming a plurality of the snapshot volumes from the base volume at a plurality of the points in time, the plurality of snapshot volumes including a rollback snapshot volume and a later-formed snapshot volume formed after the rollback snapshot volume was formed;

copying first data from the base volume to the rollback snapshot volume;

replacing the first data with second data in the base volume before forming the later-formed snapshot volume;

selecting the rollback snapshot volume for rolling back the first data to the base volume to replace the second data;

copying the second data from the base volume to the later-formed snapshot volume; and replacing the second data with the first data in the base volume by copying the first data from the rollback snapshot volume back to the base volume.

2. A method as defined in claim 1 comprising the further steps of:

replacing the second data with third data in the base volume before forming the later-formed snapshot volume and before selecting the rollback snapshot volume;

after selecting the rollback snapshot volume, copying the third data from the base volume to the later-formed snapshot volume; and replacing the third data with the first data in the base volume by copying the first data from the rollback snapshot volume back to the base volume.

3. A method as defined in claim 1 comprising the further steps of:

copying the second data from the base volume to the later-formed snapshot volume before selecting the rollback snapshot volume;

replacing the second data with third data in the base volume;

after selecting the rollback snapshot volume, determining that the third data is not to be copied to the later-formed snapshot volume; and replacing the third data with the first data in the base volume.

4. A method as defined in claim 1 comprising the further steps of:

selecting the later-formed snapshot volume for rolling back the second data to the base volume; and replacing the first data with the second data in the base volume by copying the second data from the later-formed snapshot volume back to the base volume.

5. A method of managing point-in-time data images of a base volume containing data in a data storage system, the base volume being used for data storage read and write accesses, states of the base volume at various points in time being preserved by a snapshot technique that forms snapshot volumes from the base volume at the points in time, comprising the steps of:

forming a first state of the base volume;

forming a first snapshot volume at a first point in time from the base volume when the base volume is at the first state;

forming a second state of the base volume;

copying first data from the base volume to the first snapshot volume to preserve the first state of the base volume upon forming the second state of the base volume;

forming a second snapshot volume at a second point in time after the first point in time from the base volume when the base volume is at the second state;

rolling back the first snapshot volume to the base volume to return the base volume to the first state; and copying second data from the base volume to the second snapshot volume to preserve the second state of the base volume upon rolling back the first snapshot volume to the base volume.

6. A method as defined in claim 5 comprising the further steps of:

writing the first data to the base volume to form the first state of the base volume;

writing the second data to the base volume to form the second state of the base volume, the second data replacing the first data in the base volume; and writing the first data from the first snapshot volume back to the base volume to roll back the first snapshot volume to the base volume to return the base volume to the first state, the first data replacing the second data in the base volume.

7. A method as defined in claim 5 comprising the further step of:

after returning the base volume to the first state, rolling back the second snapshot volume to the base volume to return the base volume to the second state.

8. A computerized data storage system comprising:

a controller;

a storage medium connected to the controller;

a base volume contained in the storage medium and containing primary data in a first state at a first point in time and in a second state at a second point in time;

a first snapshot volume contained in the storage medium, formed at the first point in time and containing first copy data that is a copy of at least a first portion of the primary data that was contained in the base volume at the first point in time and that was changed thereafter in the base volume, the first snapshot volume preserving the first state of the base volume; and a second snapshot volume contained in the storage medium, formed at the second point in time and containing second copy data that is a copy of at least a second portion of the primary data that was contained in the base volume at the second point in time and that was changed thereafter in the base volume, the second snapshot volume preserving the second state of the base volume;

and wherein:

the controller is operative to roll back the first snapshot volume to the base volume to copy the first copy data back to the base volume and return the base volume to the first state;

the second snapshot volume is retained in the storage medium after the rolling back of the first snapshot volume to the base volume; and the second copy data includes the second portion of the primary data that was contained in the base volume at the second point in time and that was changed thereafter in the base volume by the rolling back of the first snapshot volume to the base volume.

9. A computerized data storage system as defined in claim 8 wherein:

the controller is further operative to roll back the second snapshot volume to the base volume to copy the second copy data back to the base volume and return the base volume to the second state after rolling back the first snapshot volume to the base volume.

* * * * *